United States Patent [19]

Dayton et al.

[11] Patent Number: 5,092,552
[45] Date of Patent: Mar. 3, 1992

[54] ERGONOMIC EQUIPMENT ARM

[75] Inventors: Douglas C. Dayton, Cambridge; John D. Ardito, Bedford, both of Mass.

[73] Assignee: Wang Laboratories, Inc., Lowell, Mass.

[21] Appl. No.: 517,511

[22] Filed: Apr. 27, 1990

Related U.S. Application Data

[63] Continuation of Ser. No. 432,598, Oct. 4, 1982, abandoned.

[51] Int. Cl.⁵ .............................. B01D 27/02
[52] U.S. Cl. .................. 248/280.1; 248/181; 248/231.7; 248/278
[58] Field of Search ...................... 248/123.1

[56] References Cited

U.S. PATENT DOCUMENTS

| | | | |
|---|---|---|---|
| 1,336,253 | 4/1920 | Miller | 179/149 |
| 2,123,125 | 7/1938 | Trippe | 248/288.5 |
| 2,151,877 | 3/1939 | Walker | 248/123.1 |
| 2,202,472 | 5/1940 | Tornblom | 248/276 |
| 2,424,222 | 7/1947 | Brown | 248/278 |
| 2,452,316 | 10/1948 | Morley | 248/181 |
| 3,008,259 | 11/1961 | Zornes | 248/515 X |
| 3,204,898 | 9/1965 | Manning | 248/181 |
| 3,345,461 | 10/1967 | Bunting | 248/123.1 |
| 3,358,957 | 12/1987 | Lindenmuth | 248/279 |
| 3,374,347 | 3/1968 | Hirose | 248/292.1 X |
| 3,604,923 | 9/1971 | Moffatt | 248/324 |
| 4,145,097 | 3/1979 | Naess | 248/1 B |
| 4,165,530 | 8/1979 | Sowden | 248/280.1 |
| 4,304,385 | 12/1981 | Farouele et al. | 248/181 X |
| 4,365,561 | 12/1982 | Tellier | 248/1 B |
| 4,373,639 | 2/1983 | Tricon | 248/231.6 |
| 4,437,638 | 3/1984 | Scheibenpflug | 248/282 |

FOREIGN PATENT DOCUMENTS

| | | | |
|---|---|---|---|
| 452486 | 11/1948 | Canada | 248/280.1 |
| 936164 | 7/1949 | Fed. Rep. of Germany | 248/278 |
| 2051104 | 4/1972 | Fed. Rep. of Germany | 179/149 |
| 3037679 | 5/1982 | Fed. Rep. of Germany | 248/1 B |
| 2024926 | 1/1980 | United Kingdom . | |

*Primary Examiner*—Alvin C. Chin-Shue
*Attorney, Agent, or Firm*—Michael H. Shanahan; Kenneth L. Milik

[57] ABSTRACT

A mounting arm is disclosed on one end of which a piece of electronic or other equipment is mounted and the other end of which is detachably fastened to the edge of a supporting surface. The arm has three moving joints that permit the equipment fastened thereto to be moved with multiple degrees of freedom for desired positioning of the equipment. One joint utilizes a friction washer assembly and a preloaded torsion spring counterbalancing the weight of the equipment. The torsion spring tension is adjustable to compensate for differing weights of equipment on the one end of the arm. Another joint utilizes a friction ball joint arrangement having double concentric friction ball surfaces in an assembly that permits multiple degrees of freedom of motion and is easily removed from the remainder of the arm without disassembling the ball joint.

13 Claims, 4 Drawing Sheets

ERGONOMIC EQUIPMENT ARM

This is a continuation of co-pending application Ser. No. 06/432,598 filed on Oct. 4, 1982 now abandoned.

FIELD OF THE INVENTION

The present invention relates to movable arms on which equipment is mounted and supported while being easily moved.

BACKGROUND OF THE INVENTION

Movable arms on which equipment may be mounted are known in the art such as seen in U.S. Pat. No. 3,030,128 issued Apr. 17, 1962 to K. Versen. The movable arm shown in this patent utilizes three rotating and swivel joints in conjunction with friction couplings and a torsion spring to counterbalance the weight of a lamp at the end of the arm. The interaction of all these joints and elements permits the lamp at the end of the movable arm to be easily positioned in a large number of positions within the reach of the arm, and the lamp will stay in the position in which it is placed.

There are, however, problems with such prior art movable arms. Each movable joint has only two degrees of freedom, and when it is desired to orient the lamp or other equipment in a specific position, there is often difficulty in that the three movable joints do not cooperatively move as easily as desired when the lamp or other equipment at the end of the arm is moved.

In addition, in some applications it is sometimes desired to change the type of equipment mounted on the end of the movable arm. In the prior art, the weight of the new equipment must be the same as the weight of the original equipment being replaced. If heavier or lighter equipment is placed on the end of the arm, the counterbalancing forces within the arm are not optimum for the new weight and the equipment sometimes will not stay in a position in which it is placed. For example, with the heavier piece of equipment the arm will sag when the equipment is manually positioned and then released. To compensate for this type of problem in the prior art, the pressure on friction coupling elements in one or more of the movable joints is increased or decreased. However, when the pressure is increased it is correpondingly harder to position the heavier equipment on the end of the arm due to jerky arm movement, with the result being difficulty in positioning the equipment in a precise position. This is caused by greater forces being required to overcome the increased friction and therefore increasing the tendency to overshoot. Thus, changing pressure on friction couplings to accommodate differing weight loads on the end of a movable arm is impractical. Accordingly, in the prior art a movable arm is usually designed only for a given weight load on the end of the arm. This has been acceptable in the prior art as there has not been much demand for movable arms that can accommodate differing weight loads.

There is a need in the art for a movable arm that can be used with differing weight loads at the end of the arm without any change in the force required to move the load and without requiring different parts.

There is also a need in the art for a movable arm that can be moved more easily than in the prior art.

SUMMARY OF THE INVENTION

The above described problems with prior art movable arms are solved by our novel movable arm. Our novel arm utilizes three movable joints, two of which are pivoting joints each having two degrees of freedom, and the third joint is a unique friction ball joint having more than two degrees of freedom, which thereby allows the arm to be moved more easily. In addition, we provide means for quickly and easily adjusting the tension of a torsion spring within one of the joints of our arm to properly counterbalance differing weights on the end of the arm. This permits different weights on the end of the movable arm to all be moved with equal ease. Furthermore, we provide a clamp means on the end of our movable arm opposite the end on which the equipment is fastened which permits our movable arm to be mounted on other than a dedicated support base table. This permits greater flexibility and portability. For example, with a small computer system or word processor terminal, the video display can be mounted on the edge of an existing desk or table.

DESCRIPTION OF THE DRAWING

Our invention will be better understood on reading the following detailed description in conjunction with the drawings in which.

DETAILED DESCRIPTION

Figure 1:
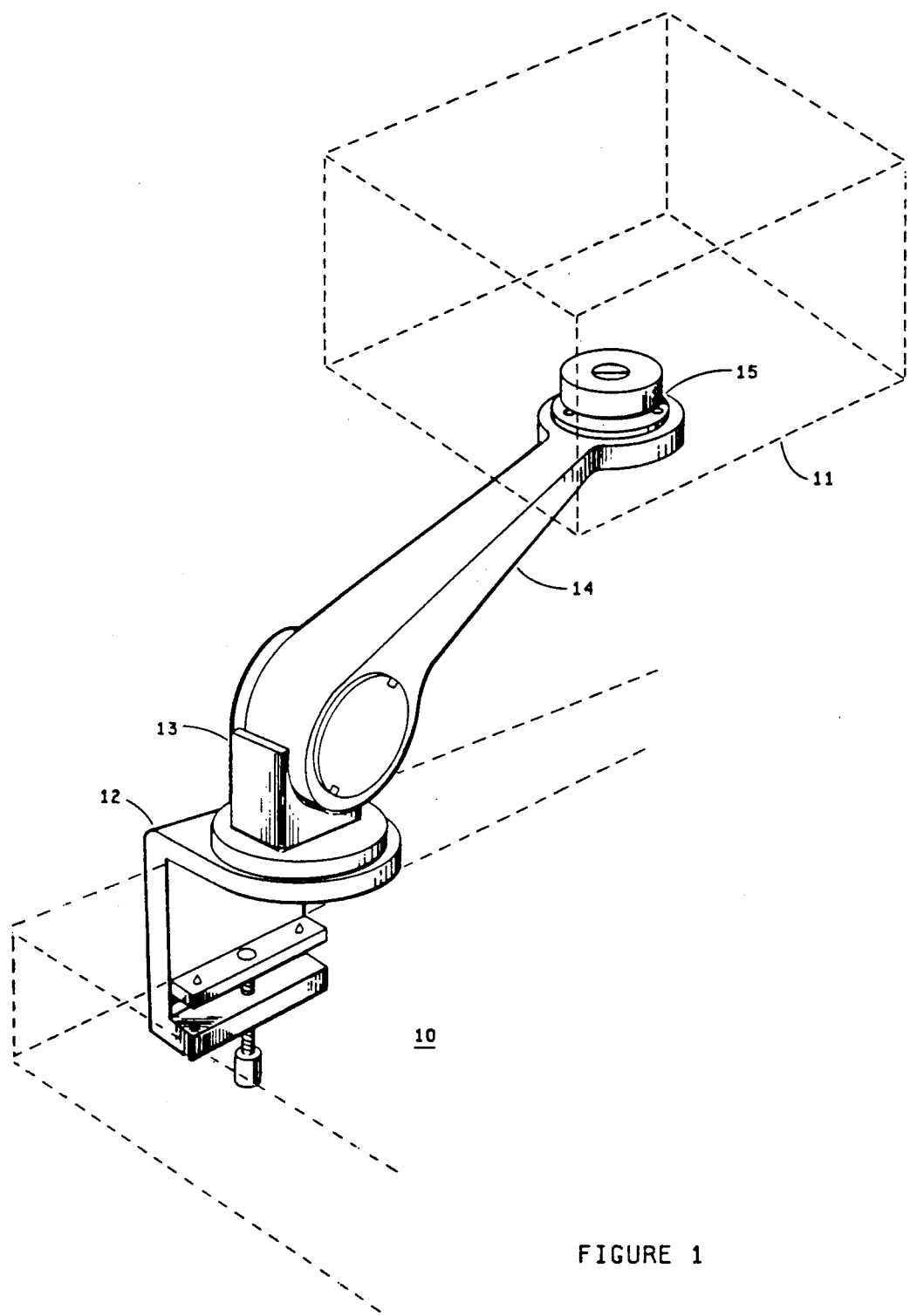
FIG. 1 shows the assembly attached to the top of a table and flexibly supporting a television type monitor.

In FIG. 1 is shown an assembled arm in accordance with the teaching of our invention. Our novel arm is quickly and easily mounted to table 10, which is shown in phantom view by means of a clamp 12. The other end of our arm is fastened to a piece of equipment 11, also shown in phantom view and, which for the present application is a video display. Our arm is made up of clamp 12 which is used to fasten our arm to the edge of a desk or table 10 or to any other mounting surface having an edge to which the clamp can be fastened. A base 13 is connected to clamp 12 such that base 13 can rotate in a plane parallel to the surface of table 10. Base 13 is connected to an arm member 14 via an adjustable torsion spring [not shown] and a friction coupling [not shown], and arm member 14 can rotate in a plane perpendicular to the plane of the top of table 10. At the outer end of arm member 14 is connected a friction ball joint assembly 15, which is in turn fastened to the base of video display 11. Friction ball joint assembly 15 enables video display 11 to be tilted forward and backward and from side to side. With friction ball joint assembly 15, video display 11 may be moved to any position, and it will remain in that position without tilting further due to its own weight. Thus, the combination of the different joints in our movable arm coupled with an adjustable torsion spring and friction coupling provides for multiple degrees of freedom of movement of our novel movable arm and video display 11.

Figure 2:
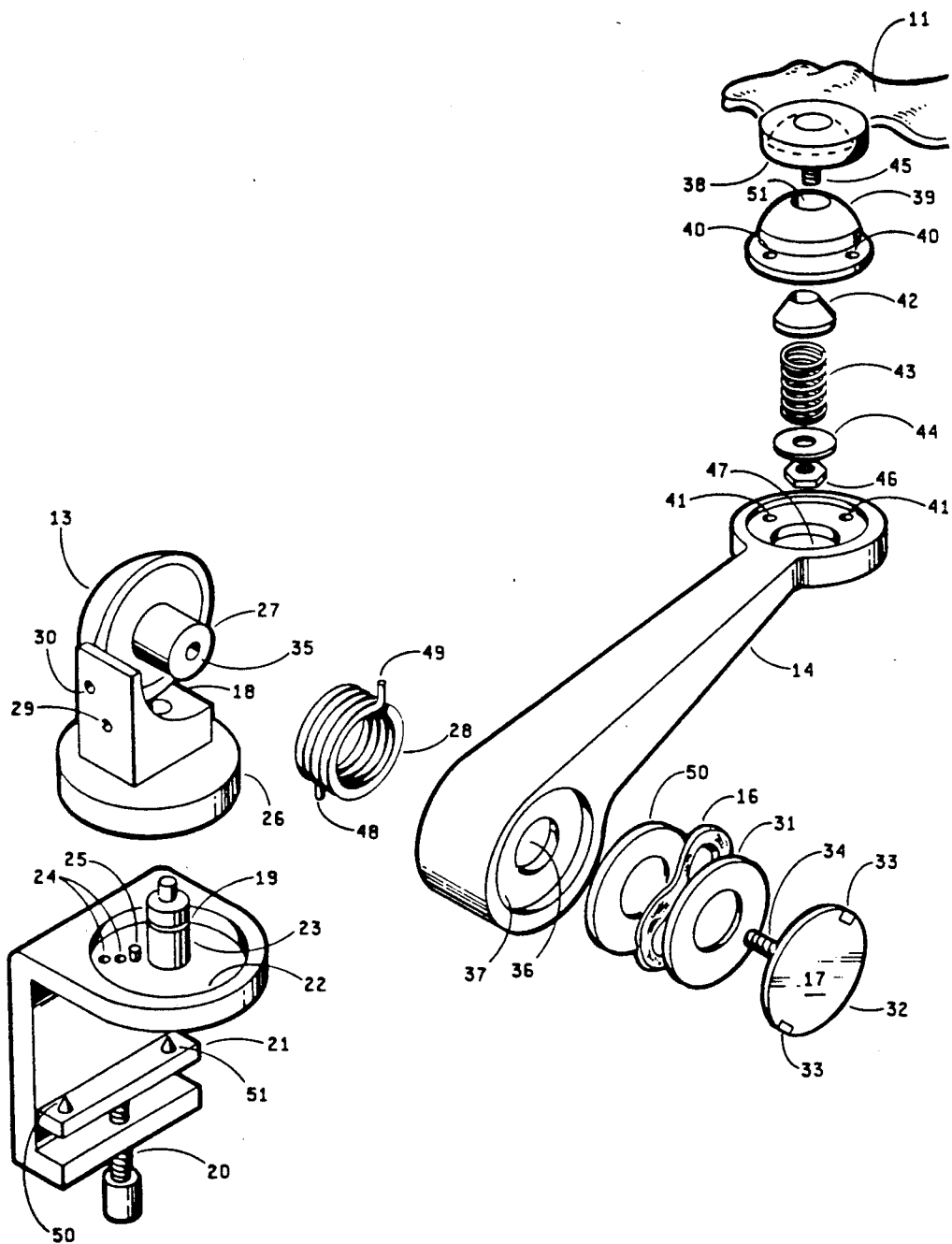
FIG. 2 is an exploded assembly drawing showing the individual elements making up our novel arm.

In FIG. 2 is shown an exploded view of our novel movable arm showing the individual components making up the arm. Clamp 12 is partially C shaped as shown to go around the edge of a desk, table or any other mounting surface, whether that mounting surface be horizontal or other than horizontal. Screw means 20 is used to move plate 21 in a vertical direction to securely fasten clamp 12 onto the edge of a table in a manner well known in the art. The top of plate 21 and its opposing surface on clamp 12 may have a piece of plastic or other material fastened thereto to provide friction in contact with the mounting surface and to prevent marring the mounting surface. Plate 21 has two conical protuberations 50 and 51 which may be created with conical set screws in threaded holes. These protuberations 50 and 51 embed in the underside of table 10 so the clamp will not slip. The top surface of clamp 12 has a circular recess 22 having a diameter only slightly larger than circular bottom 26 of base 13. Within recess 22 are located three holes 24, in one of which is placed a peg 25. The particular one of holes 24 in which peg 25 is placed determines the rotational travel of base 13 on the top of clamp 12 as will be better understood in the description for FIG. 3 further in this specification. Holes 24 may also be threaded and a set screw turned partially therein to accomplish the same result as peg 25.

Recess 22 in clamp 12 also has a pivot member 23 mounted thereon which has a groove 19 around its periphery as shown. Groove 19 is used to fasten base 13 to clamp 12 as is described hereinafter. Base 13 has a hole 18 vertically therethrough having substantially the same diameter as pivot member 23. Hole 18 may also be oversized with a brass bushing press fit therein with the inside diameter of the bushing being substantially the same diameter as pivot member 23. Base 13 is mounted down on clamp 12 with its bottom portion 26 sitting within recess 22 of clamp 12 and with pivot member 23 coming up through hole 18 of base 13. When in this position, a recessed screw [not shown] is turned inward in threaded hole 30 through base 13 until the tip of the screw extends into groove 19 around pivot member 23. There is not an interference fit between the screw and pivot member 23. A drop of thread lock sealant may be added to the thread of a screw to retain it in hole 30 without loosening. With the screw mounted in hole 30 as just described, base 13 cannot be removed from clamp 12 but can rotate about pivot member 23. A nylon piece [not shown] may be placed in recess 22 before base 13 is assembled to clamp 12 to aid in movement of base 13.

Base 13 also has a pivot member 27 which is coaxial with and mounts within hole 36 through arm member 14 when arm member 14 is assembled to base 13. The diameter of hole 36 and pivot member 27 are substantially the same. Again, a brass bushing may be used in hole 36. In assembly, torsion spring 28, partially wound to provide tension, is mounted over the outside of pivot member 27, and arm member 14 is then mounted up against base 13 on pivot member 27. When arm member 14 is mounted up against base 13, wound torsion spring 28 is captivated between these two members. Hook end 49 of torsion spring 28 is captivated by a boss [not shown] within the back side of arm member 14. Hook end 48 of torsion spring 28 crosses the axis of threaded hole 29 through base 13 and is captivated by a boss 53 [not shown in FIG. 2, but shown in FIG. 4] on base 13 to prevent torsion spring 28 from unwinding. A recessed screw 54 [not shown in FIG. 2, but shown in FIG. 4] within threaded hole 29 has the tip of the screw hitting hook end 48 of torsion spring 28. As the screw [not shown] is screwed further within hole 29, it pushes against hook end 48 of spring 28 to increase the torsion loading of spring 28 and thereby provides an effective means to adjust the torsion loading of spring 28 to compensate for different weight loads attached to the outer end of arm member 14 via friction ball joint assembly 15. Initially, screw 54 in hole 29 is set to push hook end 48 away from lip 53 [shown in FIG. 4], and thereafter the torsion of spring 28 may be increased or decreased by turning screw 54.

Arm member 14 is held assembled to base 13 in the following manner. A friction screw 17 has a broad head 32 and a threaded shaft 34 which passes through friction washer 31, wave washer 16, cork washer 50 and then through hole 36 at the bottom end of arm member 14. Threaded shaft 34 then passes through torsion spring 28 and into threaded hole 35 in the end of pivot member 27 on base 13. Head 32 of friction screw 17 has a diameter only slightly smaller than the diameter of a recess 37 in the bottom end of arm member 14. On assembly, the screw captivates washers 16, 50 and 31 within recess 37 and fastens arm member 14 onto base 13. Head 32 of friction screw 17 has two edge recesses 33, and a spanner wrench is utilized to tighten screw 17. As screw 17 is tightened against washers 16, 50 and 31, friction is created against the movement of arm member 14 about pivot member 27 due to the function of the washers. The outer end of arm member 14 has a hole 47 therethrough and a plurality of mounting holes 41 as shown. On assembly, screws coming up through threaded holes 41 from the bottom of arm member 14 will be turned into respective ones of threaded holes 40 through the flange of middle friction member 39 of our novel friction ball joint 15. This is shown in greater detail in FIG. 5. In this manner, middle friction member 39 is attached to the outer end of arm member 14. The rest of our novel friction ball joint 15 comprises an upper friction member 38, a fastening screw 45, a lower friction member 42, a spring 43, a flat washer 44, and a nut 46. The diameter of hole 47 through the outer end of arm member 14 is greater than the diameter of lower friction member 42, spring 43, flat washer 44, and nut 46. The holes through upper friction member 38 and lower friction member 42 each have a diameter only slightly larger than the diameter of the shaft of screw 45. However, the hole 50 through middle friction member 39 is significantly larger than the diameter of the threaded shaft of screw 45. The concave bottom of upper friction member 38 is spherical and has the same radius and center point of curvature as the convex spherical top of middle friction member 39. The concave bottom side of middle friction member 39 is also spherical, has a radius of curvature equal to that of the convex spherical top of lower friction member 42, and has a common center point of radius as all the spherical surfaces. On final assembly, the spherical top of lower friction member 42 is mounted up inside the spherical surface in the bottom of middle friction member 39, and the spherical top surface of member 39 is mounted up inside the spherical surface in the bottom of upper friction member 38, such that all spherical surfaces are free to move about the common center point. On assembly, nut 46 is screwed onto the threaded end of screw 45 and is screwed down to apply pressure via washer 44 and spring 43 to hold members 38, 39 and 42 against each other as is shown in greater detail in FIG. 5. Depending upon how tightly bolt 46 is screwed onto the shaft of screw 45, the degree of friction created between the spherical mating surfaces of elements 38, 39 and 42 may be varied to create our novel double surface friction ball joint 15. Upper friction member 39 is attached to video display 11 or may be an integral part of the base of video display 11. As video display 11 is tilted forward, backward or to either side, elements 38, 45, 42, 43, 44, and 46 pivot while member 39 remains in a fixed position attached to outer end of arm member 14. The friction between the assembled elements 38, 39 and 42 permit the video display 11 to be moved into a position and remain in that position.

Figure 3:
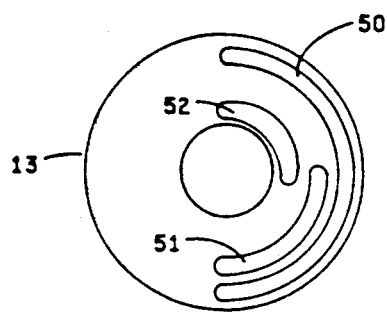
FIG. 3 is a bottom view of the base of our arm to show the manner in which it controls the maximum swing of the arm.

Turning now to FIG. 3, there is shown a bottom view of base 13. In the bottom of base 13 are located three grooves 50, 51, and 52 which lie along the periphery of circles having different radii. When base 13 is assembled to clamp 12, each of grooves 50, 51 and 52 sit directly over one of the three holes 24 in recess 22. As previously mentioned, peg 25 is inserted into one of holes 24 and extends upward out of the hole as shown in FIG. 2. The portion of peg 25 protruding up from a hole 24 extends into one of grooves 50, 51 and 52. In particular, when peg 25 is located in the one of holes 24 closest to pivot member 23 of clamp 12, the top of peg 25 protrudes into groove 52. Rotation of base 13 is thereby limited to ninety degrees in one quadrant. When peg 25 is mounted in the middle one of holes 24 of base 12, its protruding end extends into groove 51 to restrict rotation to 90 degrees in a different quadrant. With peg 25 being located in the outer one of the three holes 24, it extends into groove 50 which allows for 180 degrees rotation of base 13 about pivot member 23 of clamp 12. It would be obvious to one skilled in the art that the position and length of these grooves may be varied to suit particular applications or may be eliminated allowing a full 360 degrees rotation.

Figure 4:
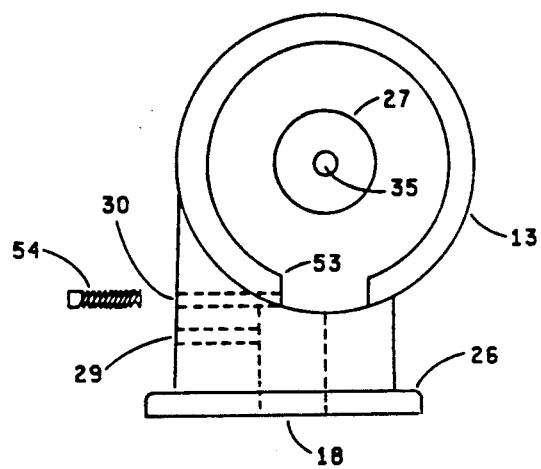
FIG. 4 is a side view of the base of our arm showing the torsion spring adjustment.

FIG. 4 is a side view of base 13 showing the aforementioned lip or boss 53 against which hook end 48 of partially wound torsion spring 28 sits when spring 28 is assembled between base 13 and arm 14 on assembly of the arm. Hook end 48 extends downward and is in line with the axis of hole 29 through base 13 and screw 54 therein, the tip of which contacts hook end 48. The tension of torsion spring 28 is increased by turning screw 54 into threaded hole 29 through base 13. Screw 54 is screwed into push hook end 48 of spring 28 away from lip 53 to set an initial tension in torsion spring 28. As different weight loads are attached to the outer end of our novel arm, screw 54 is screwed in or out to change the tension of torsion spring 28, to compensate for the different weight loads. For lighter weight loads on the end of our novel arm, screw 54 is unscrewed to decrease the tension of torsion spring 28. For heavier weights on the end of our arm, screw 54 is screwed into hole 29 to further wind tension spring 28 and thereby increase the torsion to compensate for the increased weight load.

Figure 5:
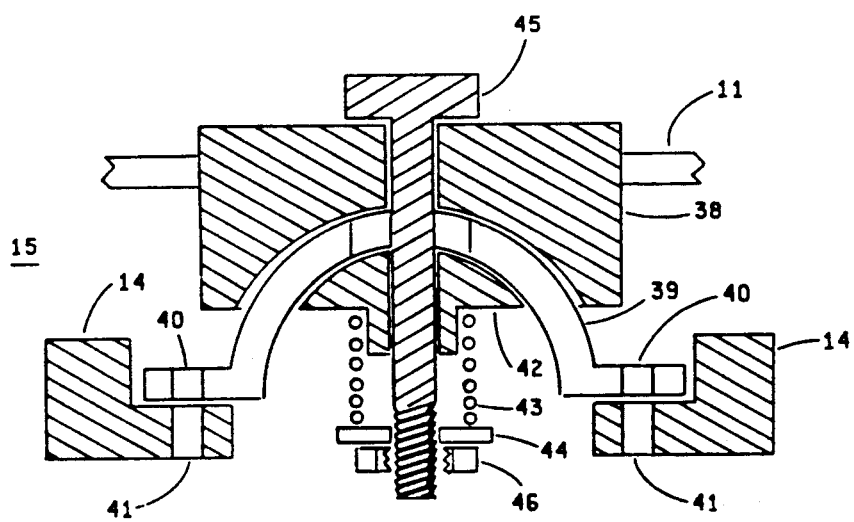
FIG. 5 is a cross sectional view of the assembled friction ball joint at the end of our arm supporting a piece of equipment such as a video display.
Figure 6:
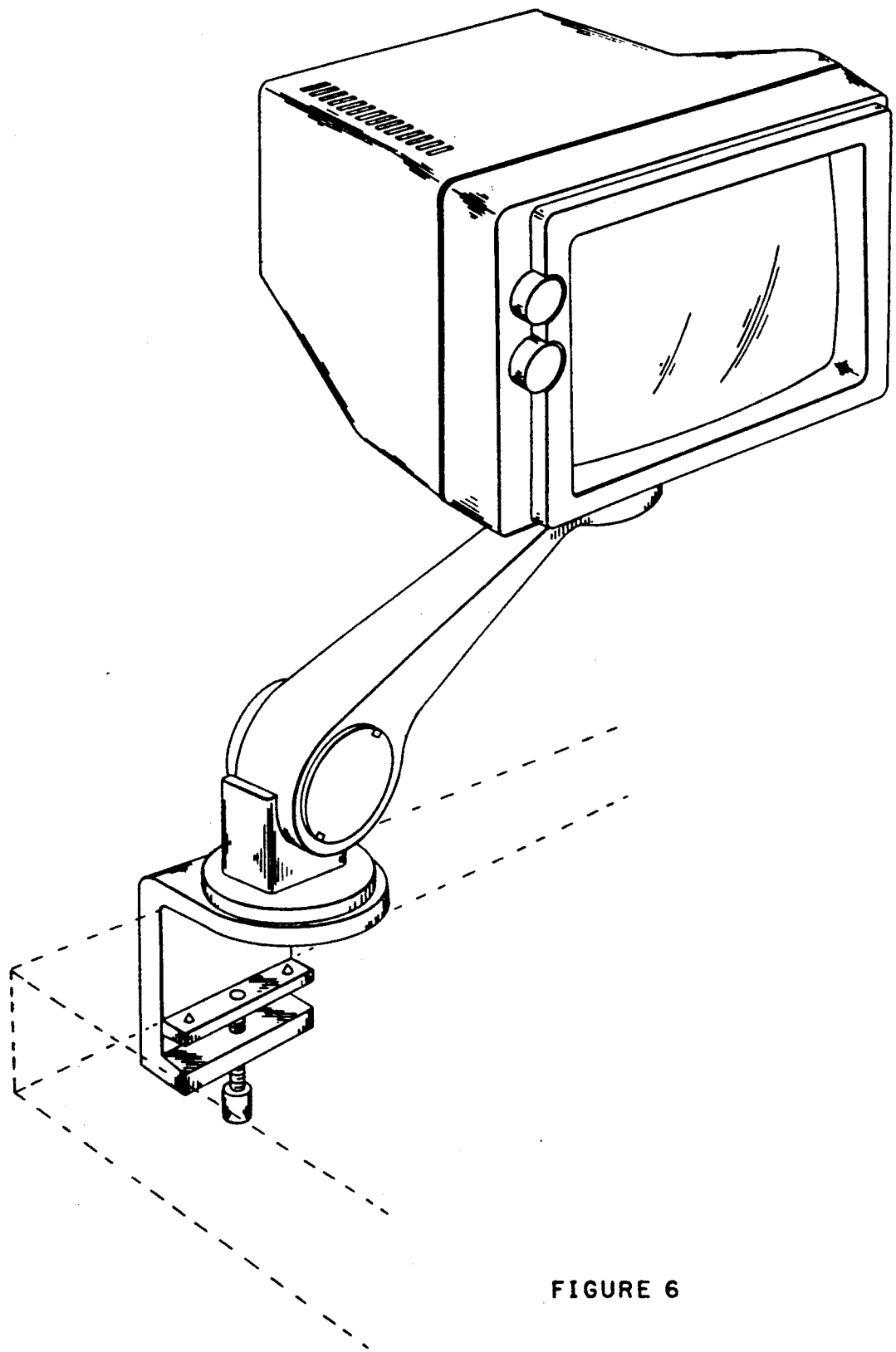
FIG. 6 is a prespective view showing the arm with a computer video monitor installed.

FIG. 5 shows the above described details of our novel friction ball joint 15 with the ball joint being in an assembled state. The outer end of arm member 14, having hole 47 therethrough, is only partially shown, with its mounting holes 41 being aligned with the holes 40 through the flange of middle friction member 39, and which is fastened to arm 14 via screws through each pair of holes 40 and 41. Thus, member 39 is affixed to arm member 14. Upper friction member 38 is an integral part of or is attached to video display 11 [not shown]. It can be seen how the spherical inner surface of upper friction member 38 matches the convex spherical surface of middle friction member 39. It can also be seen how the concave spherical surface of member 39 mates with the convex spherical surface of lower friction member 42 and all spherical surfaces have a common center point of radii. In assembly, nut 46 is fastened to bolt 45 as shown and applies pressure via washer 44 and spring 43 against lower friction member 42. This spring action forces members 38, 39 and 42 together so that there is a friction coupling as well as a ball joint function being accomplished between members 38, 39 and 42 as shown in FIG. 5. As video display 11 [not shown in FIG. 5] is tilted forward, backward or from side to side, the ball joint friction members 38, 39 and 42 rotate against each other with a friction coupling. This friction coupling permits the video display 11 to be tilted to a certain position and then to stay in that position. The degree of friction coupling in our novel friction ball joint depends upon the nature of the materials and the amount of force transmitted through spring 43 to elements 38, 39 and 42 when turning nut 46 onto bolt 45.

While what has been described above is the preferred embodiment of our invention, it would be obvious to those skilled in the art that numerous variations may be made therein without departing from the spirit and scope of our invention. For instance hole 51 through middle friction member 39 may be oval or any other shape and limit the degree to which video display 11 [not shown in FIG. 5] may be tilted. In addition, spring 43 in our friction ball joint 15 may be eliminated and pressure applied directly by nut 46. Further, it should be realized that friction ball joint 15 may be modified to eliminate one of the spherical friction surfaces.

What we claim is:

1. An arm supporting a computer video monitor on an ordinary desk or table and allowing the monitor to be moved into different orientations, comprising
    a computer video monitor, and
    an arm supporting said computer video monitor, said arm comprising
    an arm member having a base end and a monitor end,
    a base adapted to be detachably secured to the ordinary desk or table,
    a first rotatable joint rotatably connecting said base to said base end of said arm member, for permitting rotation of said arm member with respect to the desk or table, said first rotatable joint being adapted to permit rotation about vertical and horizontal axes,
    a friction member associated with said first rotatable joint to cause friction in the rotation about the horizontal axis of said first rotatable joint,
    a counterbalance attached to said arm member to support the weight of the monitor and to interact with said friction member to cause the supported monitor to stay in any desired one of a plurality of vertical positions above the desk or table, while also allowing the monitor to be moved easily by hand among said plurality of vertical positions, and
    a second rotatable joint at said monitor end of said arm member for permitting rotation of the supported monitor with respect to said arm member, said second rotatable joint being adapted to permit rotation of said monitor about vertical and horizontal axes to permit said monitor to be rotated relative to said arm member into any desired one of a plurality of positions and remain in said desired position.

2. The apparatus of claim 1 wherein said counterbalance comprises a spring.

3. The apparatus of claim 1 wherein said counterbalance comprises a torsion spring installed at said first rotatable joint between a first and a second housing adapted for relative rotation with respect to one another.

4. The apparatus of claim 3 wherein adjustment means are provided for moving one end of said torsion spring while holding the other end fixed to adjust the torque of said torsion spring to compensate for variation in the weight of the monitor.

5. The apparatus of claim 4 wherein said spring is helical and wherein said adjustment means comprises a screw means extending through one said housing with one end of said screw means touching said one end of said spring, said screw means being adapted so that as it is wound it moves said one end of said torsion spring so as to either increase or decrease the torque of said spring.

6. The apparatus of claim 1 wherein said base comprises a clamp for detachably securing said base to the edge of said desk or table, said clamp having a first horizontal surface for resting on the upper surface of said desk or table, and a second horizontal surface adapted to be clamped against the undersurface of the edge of said desk or table.

7. The apparatus of claim 6 wherein said second horizontal surface of said clamp has protuberances adapted to engage and grip the edge of said desk or table.

8. The apparatus of claim 1 wherein said second rotatable joint comprises a frictional ball joint permitting rotation in two degrees of freedom.

9. The apparatus of claim 8 wherein said frictional ball joint comprises mating convex and concave spherical surfaces squeezed together by a fastening means.

10. The apparatus of claim 9 wherein said mating spherical surfaces are provided by clamping three elements together, a spherically-shaped middle shell positioned between inner and outer elements providing mating convex and concave surfaces, respectively.

11. The apparatus of claim 10 wherein said three elements are clamped together by a bolt passing between said inner and outer elements and through an aperture in said middle shell.

12. The apparatus of claim 1 wherein said friction member comprises
a friction screw having a wide head and a screw shaft passing through said first housing and threadably coupling to said second housing, and
at least one friction washer between the head of said friction screw and said second housing.

13. The apparatus of claim 12 wherein said friction washers comprise a plastic washer and a cork washer on either side of a wave washer.

* * * * *